United States Patent Office 3,677,728
Patented July 18, 1972

3,677,728
METHOD OF MANUFACTURING CRYSTALLINE-GLASS ARTICLES
Isaak Iljich Kitaigorodsky, deceased, late of Moscow, U.S.S.R., by Evgenya Antonovna Kitaigorodskaya, administrator, Petrovsky buljvar 4/6, Apt. 4, Moscow, U.S.S.R.
No Drawing. Continuation-in-part of application Ser. No. 816,139, Feb. 27, 1969, which is a continuation of application Ser. No. 644,762, June 6, 1967, which in turn is a continuation-in-part of application Ser. No. 302,456, Aug. 15, 1963. This application Mar. 23, 1970, Ser. No. 22,051
Int. Cl. C03c 3/22
U.S. Cl. 65—19
4 Claims

ABSTRACT OF THE DISCLOSURE

In a method for manufacturing crystalline-glass articles non-metallic additives containing $SiO_2$ are dissolved together with a selected nucleating agent in a molten slag obtained directly from a metallurgical furnace. The glass melt is then homogenized, clarified, molded into the shape of the desired article, and then heat-treated to crystallize the article. The melt contains from 45 to 75 weight percent of slag. The nucleating agents used are iron and manganese sulfides, fluorine, and chromium, phosphorous, magnesium and titanium oxides.

---

This application is a continuation-in-part of application Ser. No. 816,139, filed Feb. 27, 1969, which is a streamlined continuation of Ser. No. 644,762, filed June 6, 1967, both now abandoned, which in turn is a continuation-in-part of Ser. No. 302,456, filed Aug. 15, 1963, now abandoned.

The present invention relates to methods of manufacturing articles of crystalline-glass which are employed in materials and sanitary engineering articles, as well as in the construction industry in the form of wall panels, facing other industries.

At present methods of manufacturing crystalline-glass articles are known which comprise preparing a glass batch containing nuclei-forming additives, and heating said batch until a homogeneous melt is obtained, which is then clarified. Articles are formed from the melt and subjected to crystallization. The nuclei-forming additives employed are certain metals (Au, Ag, etc.), oxides ($TiO_2$, $Ta_2O_5$, $Nb_2O_5$, $SnO_2$, etc.) and metal sulfides (cf. U.S. Pats. 2,920,971 and 3,113,877).

It is likewise known to use blast furnace slag as raw material for the manufacture of crystalline-glass articles (U.S. Pat. 3,170,780).

To induce crystallization, the formed articles are cooled to a temperature at which centers of crystallization are formed, held at this temperature for the time required for the formation of centers of crystallization and then reheated to a temperature at which most of the glass crystallizes.

According to all the previously known methods, a batch is first prepared and then melted. This requires a preliminary preparation of raw materials (drying, grinding, screening) and involves the use of a cumbersome plant, as well as substantial power consumption.

As a rule, previously known methods require the use of raw materials which are expensive or in short supply such as $B_2O_3$, $GeO_2$, $Li_2O$, $Ta_2O_5$, etc. which raises costs of articles and to a considerable extent limits their application.

It is an object of the present invention to provide a method of manufacturing articles of crystalline-glass according to which the use of expensive chemical raw materials is completely eliminated, or the amount of said expensive chemical raw material used is substantially reduced.

This and other objects have been achieved by the provision of a method of manufacturing articles of crystalline-glass which comprises introducing into molten slag direct from a furnace, which slag constitutes 45–75 weight percent of the melt, additives of non-metallic minerals containing $SiO_2$ and additives of nuclei-forming agents from the group consisting essentially of 1.5–5 wt. percent MnS and FeS; 1.5–5 wt. percent MnS and FeS and 1.6–2.5 wt. percent F; 3–6 wt. percent $TiO_2$ and 5–10 wt. percent $P_2O_5$; or 1–3 wt. percent $Cr_2O_3$ and 5–10 wt. percent MgO; the temperature of the slag being maintained in the range of 1400 to 1500° C. to permit complete solution of the additives. The glassy melt thus obtained is homogenized and clarified and formed into articles which are crystallized by heating.

As additives of non-metallic minerals containing $SiO_2$ it is possible to use quartz sand and various types of clay and rock. For example, semi-acidic clays ($SiO_2$ 78.7; $Al_2O_3$ 13.4; $Fe_2O_3$ 0.5; CaO 0.2; MgO 1.2; $Na_2O+K_2O$ 2.2; $SO_3$ 3.8) or acidic and ultra-acidic rocks, in particular liparites ($SiO_2$ 74.0; $TiO_2$ 0.3; $Al_2O_3$ 13.7; $Fe_2O_3$ 1.5; FeO 0.9; MgO 0.4; CaO 1.2; $Na_2O$ 3.4; $K_2O$ 4.6), all in percent by weight. Additives of non-metallic minerals containing $SiO_2$ are necessary in order to convert the molten slag into molten glass. This makes it possible, when forming articles, to make use of conventional glass-forming machines. If it is necessary for the glassy melt to have high forming qualities, it is advantageous to add oxides or salts of alkali or alkaline earth metals in the amount up to 15% by weight of the melt.

Sulfides of iron and manganese can be added to the melt as such or in the form of sulfates in combination with a reducing agent such as coke, coal, etc. If $TiO_2$ and $P_2O_5$ are used as the nuclei-forming agents, titanium is advantageously introduced in the form of titanium-containing slag, and phosphorus in the form of ammonium phosphate. If $Cr_2O_3$ and MgO are added as the nuclei-forming agents it is advantageous to use slag with a high magnesia content and introduce chromium in the form of chromite.

Introduction of the above nuclei-forming agents promotes the formation of a fine crystalline structure in the articles manufactured, which is a requisite for good physico-chemical properties.

The process of manufacturing crystalline-glass articles is greatly simplified by using molten slag direct from a metallurgical furnace. The temperature of the molten slag, when drawn off, varies over a wide range depending on the type of production and the composition of the slag, for example, for blast furnace slags the temperature ranges from 1280 to 1600° C.

When molten slag direct from the furnace is used, the operations of granulating the slag and preparing the batch are eliminated. Thus, it is unnecessary to prepare raw materials (drying, grinding, screening, etc.). Moreover, using molten slag as it is tapped affords a substantial reduction in fuel consumption inasmuch as the greater part of the ingredients are in the molten slag.

Since all the basic ingredients necessary for the production of molten glass are contained in the slag, the use of pure chemical raw material is greatly reduced or even eliminated completely. Furthermore, the slag itself is normally treated as waste. These factors substantially lower the cost of the articles made from the crystalline-glass.

According to the present method it is possible to utilize freshly tapped molten slag from diverse productions (blast-furnace, steel-making, non-ferrous metallurgical, etc.), but it is more advantageous to use molten slag as drawn off from the blast furnace.

The heat treatment schedule depends on the chemical composition of the glass and to a great degree on the type of articles to be manufactured. Basically, two different types of glass are dealt with, for the glasses in which the temperature at which intensive crystallization occurs exceeds the softening point by less than 50° C., formed articles are preferably heated to a temperature of 900 to 1000° C. at a maximum rate of 10 degrees per minute and held at said temperature for a minimum of one hour. For glasses in which the temperature at which intensive crystallization occurs exceeds the softening point by more than 50° C., formed articles are preferably first heated to 700 to 900° C. and held at said temperature for a minimum of 30 minutes and then heated to 900 to 1000 C. at a maximum rate of 10 degrees per minute and held at this temperature for a minimum of one hour.

Important advantages of the present invention are that the process is simplified from the engineering standpoint and the cost of crystalline glass articles is lowered.

Irrespective of the type of slag used and the chemical composition of the same, the flow sheet for the production of crystalline glass articles remains unchanged. Hereinbelow are described the principal stages in the manufacture of articles of crystalline glass, with the use of molten slag direct from the furnace.

Molten slag immediately after being tapped from the blast furnace at a temperature of 1340 to 1360° C. is passed into a converter in which the temperature is maintained at 1400 to 1450° C. Additives are charged into the converter simultaneously, said additives being quartz sand and nuclei-forming agents. The melt in the converter is homogenized in 15 to 30 minutes by vigorous bubbling. The glassy melt is drawn off from the converter into a heated metal runner lined with refractory, through which it passes into a glass melting tank, where the molten glass is clarified. The maximum temperature in the clarification zone is 1470 to 1480° C. and in the processing zone 1380 to 1390° C.

Articles are formed by conventional methods of glass technology. Sheet material is advantageously formed as a continuous ribbon of 8 to 20 mm. thickness, employing the Miller rolling machine. Piece articles, such as blocks, tiles, insulators, etc. are advantageously formed by pressing, employing the presses widely used at glass works.

Formed articles are sent to a continuous crystallizing furnace where they are heat-treated according to a present schedule. During heat-treatment the glass crystallizes with the formation of a fine crystalline structure.

The size of the crystals does not exceed 2 to 3 microns, while the amount of the crystalline phase comes to 70% by weight or more.

The chemical composition of three exemplary blast furnace slags is given in Table 1.

TABLE 1

| Slag | Composition, wt. percent | | | | | | | | | | |
|---|---|---|---|---|---|---|---|---|---|---|---|
| | $SiO_2$ | $Al_2O_3$ | CaO | MgO | $TiO_2$ | MnO | FeO | $Fe_2O_3$ | $V_2O_5$ | $Na_2O$ | S |
| A | 36.1±3 | 11.9±1 | 45.4±1 | 1.5±0.5 | 6.1±0.5 | 2.7±0.5 | | 0.5±0.2 | | 0.3±0.1 | 0.3±0.2 |
| B | 38.1±3 | 15.8±1 | 27.5±1 | 8.7±0.5 | 6.9±0.5 | 0.5±0.1 | 1±0.2 | | 0.2±0.5 | | 1.3±0.5 |
| C | 32.3±2 | 15.8±1 | 33.7±1 | 10.7±0.5 | 5.1±0.5 | 0.5±0.1 | 0.6±0.1 | | | | 0.2±0.3 |

Examples of nuclei-forming agents are given in Table 2.

TABLE 2

| Example | Nuclei-forming agents | Amount, wt. percent |
|---|---|---|
| 1 | FeS + MnS | 1.5–5.0 |
| 2 | FeS + MnS | 1.5–5.0 |
|   | F | 1.6–2.5 |
| 3 | $TiO_2$ | 3.0–6.0 |
|   | $P_2O_5$ | 5.0–10.0 |
| 4 | $Cr_2O_3$ | 1.0–3.0 |
|   | MgO | 5.0–10.0 |

Composition of the glass, heat treatment conditions and properties of the crystalline-glass articles are given in Table 3.

TABLE 3

| Characteristic | Composition | | | |
|---|---|---|---|---|
| | 1 | 2 | 3 | 4 |
| Ingredients, wt. percent: | | | | |
| Slag A | 54.4 | 54.0 | | |
| Slag B | | | 72.5 | |
| Slag C | | | | 52.4 |
| Sand | 27.5 | 33.0 | 14.5 | 29.8 |
| Clay | 11.2 | 3.0 | | 7.2 |
| Sodium sulfate | 5.5 | 5.0 | | 8.0 |
| Sodium fluosilicate | | 3.6 | | |
| Ammonium phosphate | | | 13.0 | |
| Chromite | | | | 2.6 |
| Coal | 1.4 | 1.4 | | |
| Heat treatment, °C. | | | | |
| First stage crystallization | 700° for 1 hr | 700° for ½ hr | 900° for 2 hr | 950° for 1½ hr. |
| Second stage crystallization | 900° for 1 hr [1] | 900° for 1 hr [2] | 1,000° for 2 hr [3] | Heat treatment in one stage only. [4] |
| Properties of articles | | | | |
| Volume weight, g./cm.³ | 2.65 | 2.60 | 2.90 | 2.95 |
| Thermal coefficient of expansion (×10⁻⁷), 1/degree | 68 | 70 | 60.8 | 75 |
| Thermal stability, °C | 250 | 250 | 280 | 250 |
| Initial softening point, °C | 1,100 | 1,000 | 1,100 | 1,050 |
| Bending strength, kg./cm.² | 1,500 | 1,600 | 1,800 | 1,600 |
| Abrasive resistance, g./cm.² | 0.03 | 0.03 | 0.03 | Up to 0.02 |

[1] Temperature rise from 700° to 900° at 3° per minute.
[2] Temperature rise from 700° to 900° at 6° per minute.
[3] Temperature rise from 900° to 1,000° at 10° per minute.
[4] Temperature rise at 3–5° per minute.

I claim:

1. A method of manufacturing articles made of crystalline-glass comprising the steps of providing a molten slag from a metallurgical furnace; introducing into said molten slag additives of non-metallic minerals containing $SiO_2$ and a nuclei-forming agent selected from the group consisting of 1.5–5 wt. percent of FeS and MnS, 1.5–5 wt. percent of MnS and FeS and 1.6–2.5 wt. percent F, 3–6 wt. percent $TiO_2$ and 5–10 wt. percent $P_2O_5$, and 1–3 wt. percent of $Cr_2O_3$ and 5–10 wt. percent MgO; maintaining the temperature of said slag at 1400–1500° C. to permit complete solution of said additives and form a glassy melt, said slag constituting from 45–75 wt. percent of said melt; homogenizing and clarifying said glassy melt; forming articles from said melt and crystallizing said articles by heating, wherein intensive crystallization occurs at a temperature exceeding the softening point of said article by less than 50° C., said crystallizing step including the steps of heating said articles to a temperature in the range of from 900–1000° C. at a rate of 10° C./min. and holding at this temperature for one hour.

2. A method of manufacturing articles made of crystalline-glass comprising the steps of providing a molten slag from a metallurgical furnace; introducing into said molten slag additives of non-metallic minerals containing $SiO_2$ and a nuclei-forming agent selected from the group consisting essentially of 1.5–5 wt. percent of FeS and MnS, 1.5–5 wt. percent of MnS and FeS and 1.6–2.5 wt. percent F, 3–6 wt. percent $TiO_2$ and 5–10 wt. percent $P_2O_5$, or 1–3 wt. percent of $Cr_2O_3$ and 5–10 wt. percent MgO; maintaining the temperature of said slag at 1400–1500° C. to permit complete solution of said additives and form a glassy melt, said slag constituting from 45–75 wt. percent of said melt; homogenizing and clarifying said glassy melt; forming articles from said melt and crystallizing said articles by heating, wherein intensive crystallization occurs at a temperature exceeding the softening point of said article by more than 50° C., said crystallizing step including the steps of heating said articles to a temperautre in the range of from 700–900° C. and holding for 30 minutes; then heating said article to a temperature in the range of from 900–1000° C. at a rate of 10° C./min. and holding for one hour.

3. A method of producing glass-crystalline articles comprising the steps of providing a molten slag; heating said slag to dissolve from 30–90% by weight of said slag of non-metallic mineral additives containing $SiO_2$, and a nucleating agent selected from the group consisting essentially of from 1.5–5 weight percent of MnS and FeS, 1.5–5 weight percent of MnS and FeS and 1.6–2.5 weight percent of F, 3–6 weight percent of $TiO_2$ and 5–10 weight percent of $P_2O_5$, or 1–3 weight percent of $Cr_2O_3$ and 5–10 weight percent of MgO, all weight percents being of said slag and said additives, for obtaining a fine-grain structure; homogenizing and clarifying the prepared melt; molding said melt into sheets; heating said sheets to a first temperature of about 700° C. for 30 minutes, then heating to a second temperature of about 900° C. and holding for about one hour to obtain a fine crystal structure.

4. A method as claimed in claim 3 wherein the rate of elevating the temperature from said first temperature to said second temperature is about 6° C. per minute.

References Cited
UNITED STATES PATENTS

| | | | |
|---|---|---|---|
| 2,217,808 | 10/1940 | Nye | 65—19 |
| 2,932,922 | 4/1960 | Mauritz | 65—33 |
| 3,113,877 | 12/1963 | Janakirama-Rao | 106—52 |
| 3,170,780 | 2/1965 | Takehara et al. | 65—33 |

S. LEON BASHORE, Primary Examiner

R. L. LINDSAY, JR., Assistant Examiner

U.S. Cl. X.R.

65—33; 106—39 DV, 51